United States Patent [19]

Baker

[11] Patent Number: 5,261,446

[45] Date of Patent: Nov. 16, 1993

[54] SELF-CONTAINED EMERGENCY SHUTDOWN VALVE

[76] Inventor: Gerald S. Baker, 10610 Olympia, Houston, Tex. 77042

[21] Appl. No.: 979,908

[22] Filed: Nov. 23, 1992

[51] Int. Cl.⁵ ............................................. F16K 17/00
[52] U.S. Cl. ................................... 137/458; 137/463; 251/73
[58] Field of Search .................... 137/458, 463; 251/73

[56] References Cited

U.S. PATENT DOCUMENTS

| | | | |
|---|---|---|---|
| 723,402 | 3/1903 | Moore et al. | 137/463 |
| 2,327,055 | 8/1943 | McMahon | 137/458 |
| 2,693,819 | 11/1954 | Otis | 137/458 |
| 3,198,207 | 8/1965 | Willis et al. | 137/458 |
| 3,429,321 | 2/1969 | Thrall | 137/77 |
| 3,602,249 | 8/1971 | Zingg | 137/458 X |
| 4,087,073 | 5/1978 | Runberg et al. | 137/458 X |
| 4,457,334 | 7/1984 | Becker et al. | 137/463 X |
| 5,046,376 | 9/1991 | Baker | 74/424.8 |

FOREIGN PATENT DOCUMENTS 3114359  12/1982  Fed. Rep. of Germany ...... 137/458

OTHER PUBLICATIONS

Bulletin 680 from Barber Industries Ltd. Describing RA-Presco-Dyne Self-Contained Emergency Shut Down System for Reverse Acting Gate Valves, dated Jun. 1989.

*Primary Examiner*—Stephen M. Hepperle

[57] ABSTRACT

The improved valve of the present invention is a self-contained emergency safety shutdown valve which does not require the attendance of an individual or an outside power source for its emergency shutdown. The valve illustrated is a gate valve with the gate movable between positions opening and closing flow through the valve and having a stem which is controlled by a ball shaft extending through a rotary ball nut with means for preventing rotation of ball nut in one direction and means urging stem, gate and ball shaft in a direction closing flow through the valve. The control means controlling the release of the rotation preventing means is controlled by both high and low pressure responsive devices which are interconnected to a plunger for operating the release and to a plunger for sensing the pressure downstream of the valve. At any time the sensed pressure is beyond either the low or high pressure set points, the plunger is moved to operate the release and the gate is returned by the urging means to its closed position. A means is provided by which the release means it held in the release position until manually released but is easily manually release so that the gate may be opening while the control means is ineffective to cause shutdown until normal flow conditions are established.

8 Claims, 12 Drawing Sheets

SELF-CONTAINED EMERGENCY SHUTDOWN VALVE

BACKGROUND

The present invention relates to an improved valve which is a self-contained emergency shutdown valve which is manually and spring operated and which will close any time its high or low pressure presettings are exceeded.

Prior to the present invention, there have been emergency shutdown valves, which valve is either hydraulically or electrically operated. This requires that the source of power (hydraulic or electric) be available at the valve to ensure that the valve will close responsive to line conditions. The unit manufactured by Barber Industries Ltd. of Calgary, Alberta Canada (T2H 2P3) and Edmonton, Alberta, Canada (T6E 4S8) and having the name of RA-PRESCO-DYNE, which device is designated to be a self-contained emergency shutdown system for reverse acting gate valves which are actuated either electrically or hydraulically.

U.S. Pat. No. 3,429,321 discloses a safety valve actuator which uses springs for high and low set points, uses a spring to close the valve and manually resets the valve after tripping. A pivoted trigger is positioned to engage a shoulder on the stem to prevent its closing movement until the trigger is pivoted out of engagement with the shoulder. Pivoting of the trigger is the result of the high-pressure trip pulling upward on one portion of the trigger and low-pressure trip pushed downward on a second portion of the trigger. Both cause the trigger to pivot and disengage from the shoulder so that the valve closes responsive to the force of the stem spring. When resetting, the valve must be held open manually until line pressure is between the high and low set points. Additionally, the low set point is adjusted by threading within the high set point adjustment. Thus any adjustment of the high set point changes the low set point.

U.S. Pat. No. 3,198,207 discloses a fluid pressure controlled shut-off valve which operates responsive to predetermined line pressures. The device is powered by the downstream pressure and is not suggestive of the structure of the improved device of the present invention.

U.S. Pat. No. 5,046,376 discloses a shaft locking or manual operating apparatus for operating a gate valve manually which includes a nut, a screw shaft and balls in the grooves of the nut and shaft to provide a limited friction device together with a wrapped spring preventing rotation in one direction except when released and the rotation of one of the nut or shaft causes axial movement of the shaft which is used to operate a gate valve or to be used to lock a shaft such as a blowout preventer ram tail rod against axial movement.

Other systems have been used for emergency shutdown of valves, but those required a source of fluid pressure.

A pilot by-pass valve has been offered to the oil and gas industry by Cameron Iron Works, Inc. in which a low pressure actuated automatic safety valve can be opened when the auxiliary pilot has shut off the supply pressure. Manual operation of the by-pass valve directs supply pressure to the valve operator. As soon as line pressure returns the auxiliary pilot to normal position, the by-pass valve cuts out and the automatic safety valve is again on automatic operation.

SUMMARY

The present invention provides a totally self-contained emergency shutdown valve in which the valve is manually operated to the open position and is spring operated to the closed position. The actuator consists of an overhauling ball screw with a wrap spring clutch to prevent overhauling. It also has a spring for fail-safe closed operations. The valve can be opened manually by turning the handwheel as with any manual valve. When the valve is open, the fail-safe spring is trying to close it, but the wrap spring clutch keeps it from closing. The high-low shutdown mechanism is contained in a control box which is an integral part of the actuator. When the actual line pressure gets too high or too low, the shutdown mechanism pushes the release tang of the wrap spring clutch, allowing the valve to be closed by the fail-safe spring.

An object of the present invention is to provide an improved self-contained emergency shutdown valve which does not vent any of the fluids in the valve.

Another object of the present invention is to provide an improved self-contained emergency shutdown valve which uses contained line pressure to sense the high and low pressure points so that the valve will close responsive to either pressure above the preset high set point or below the preset low set point.

A further object of the present invention is to provide an improved self-contained emergency shutdown valve which does not require any outside power to be present in its safety shutdown and in its resetting.

A still further object of the present invention is to provide an improved self-contained emergency shutdown valve which requires only light loading to release the safety shutdown system and includes a means for disconnecting the release during manual resetting of the valve.

BRIEF DESCRIPTION OF THE DRAWINGS

These and other objects and advantages of the present invention are hereinafter set forth and explained with reference to the drawings wherein:

FIG. 1 is a sectional view of the improved valve of the present invention in two views with the valve in its open or flowing position.

FIG. 2 is a sectional view similar to FIG. 1 of the improved valve in two views with the valve in its closed or non-flowing position.

DESCRIPTION OF THE PREFERRED EMBODIMENTS

Figure 1A:
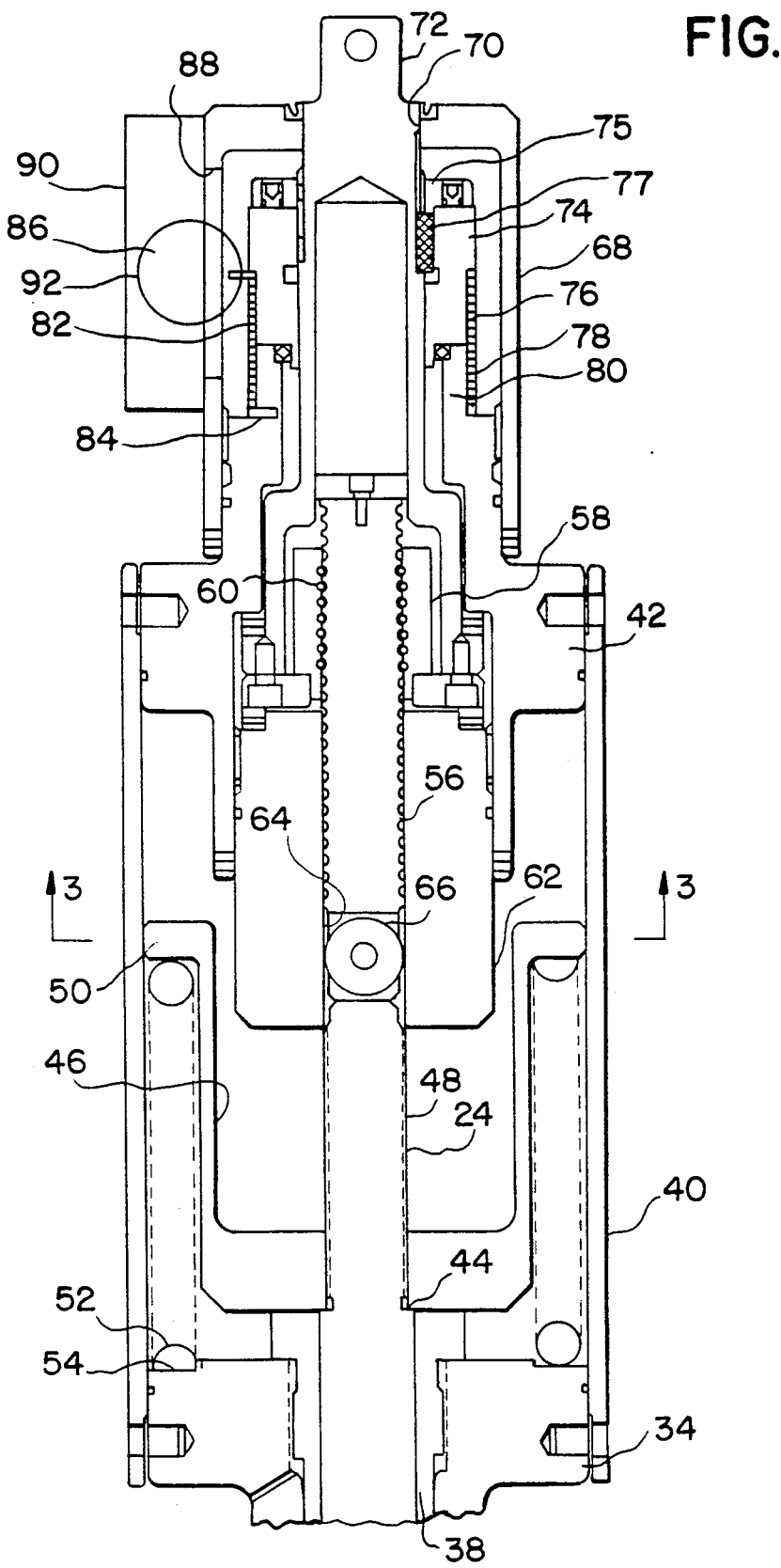
FIG. 1A shows the upper portion of the valve and FIG. 1B shows the lower portion of the valve.
Figure 1B:
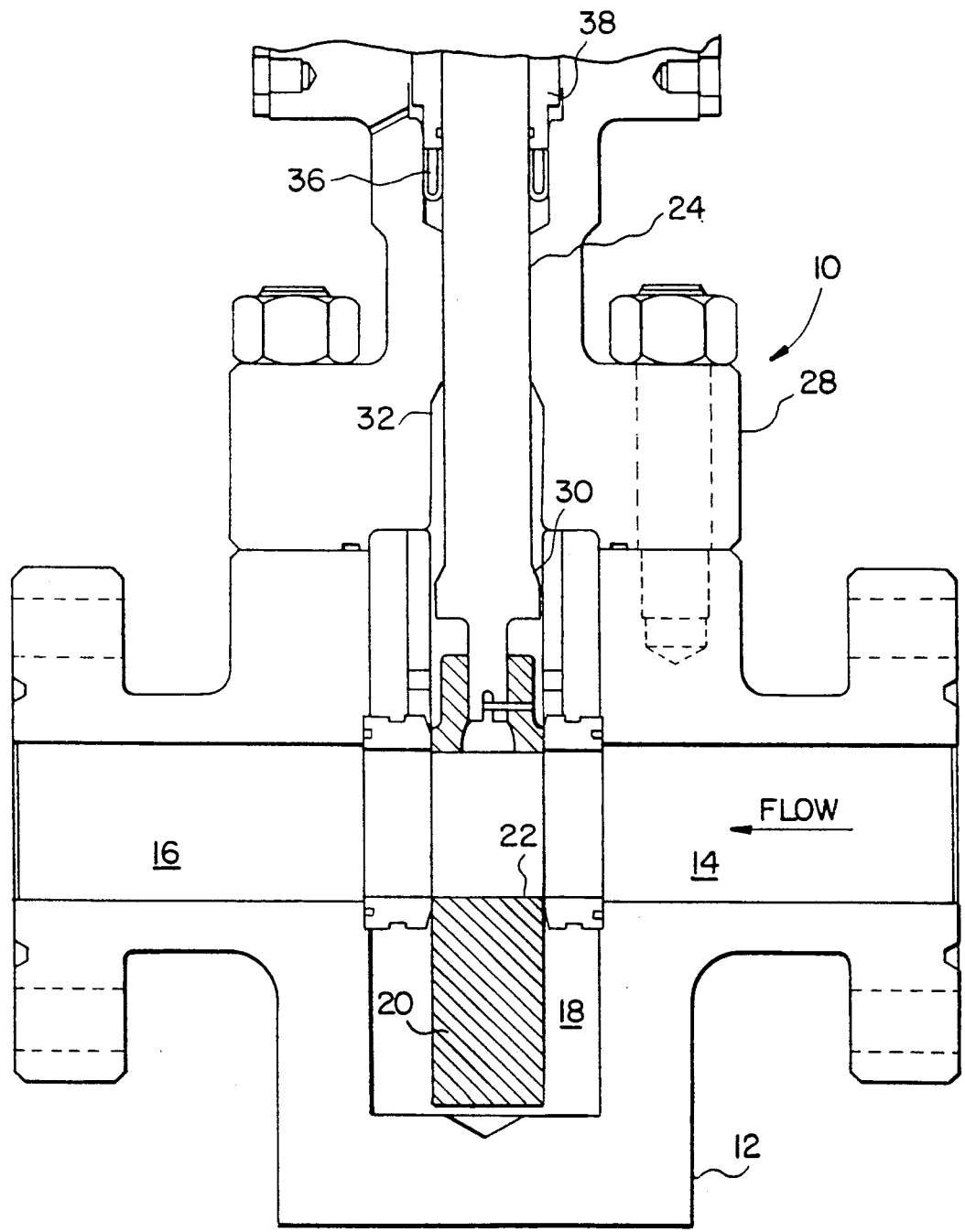
Figure 2A:
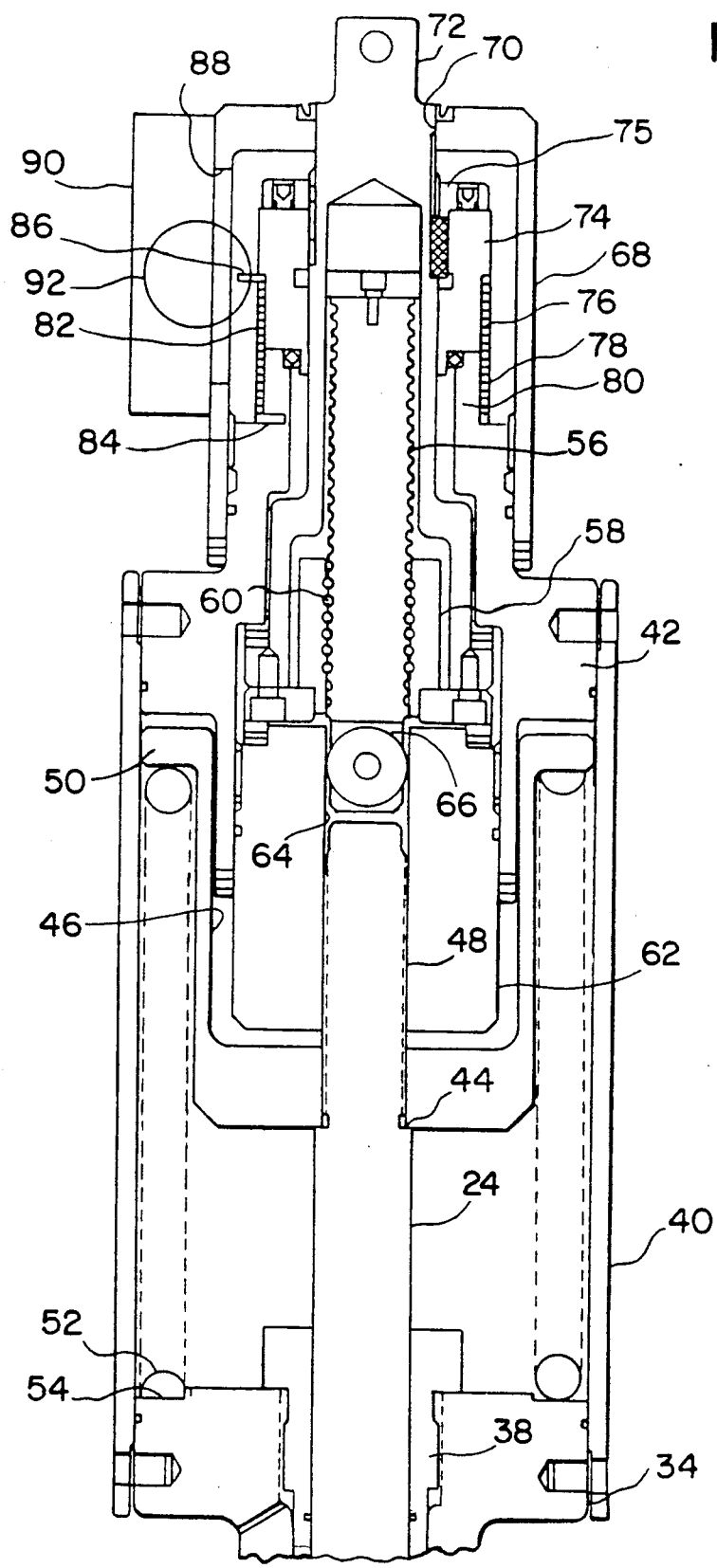
FIG. 2A shows the upper portion of the valve and FIG. 2B shows the lower portion of the valve.
Figure 2B:
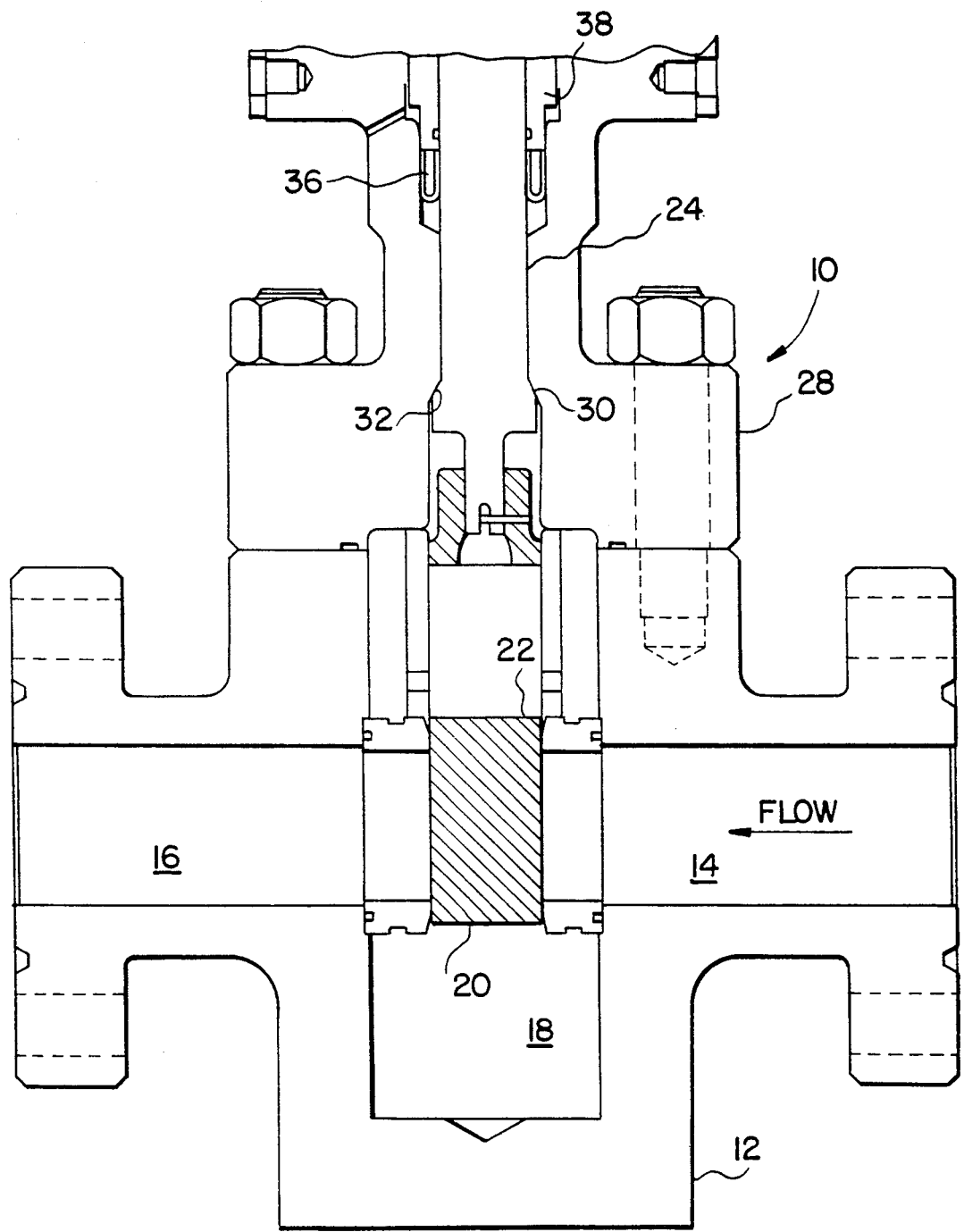

As shown in FIGS. 1A and 1B, valve 10 includes body 12 having inlet 14, outlet 16 and gate chamber 18 between. Gate 20 is positioned within gate chamber 18 in a position either providing flow between inlet 14 and outlet 16 through opening 22 in gate 18 or to block or close flow therebetween. Gate 20 is movable within chamber to such positions. Stem 24 is connected to gate 20 and extends through opening 26 in bonnet 28 which is secured to body 12 in a position closing the opening of gate chamber 18 in body 12. Gate stem 24 includes external tapered shoulder 30 which is adapted to coact with internal tapered shoulder 32 on the inner end of opening 26 to provide a stem seal whenever gate 20 and stem 24 are in their outermost positions as shown in FIGS. 2A and 2B. The upper end 34 of opening 26 is enlarged in diameter to receive seal 36 which is held in place by nut 38 threaded into the end opening 34 as shown.

Figure 3:
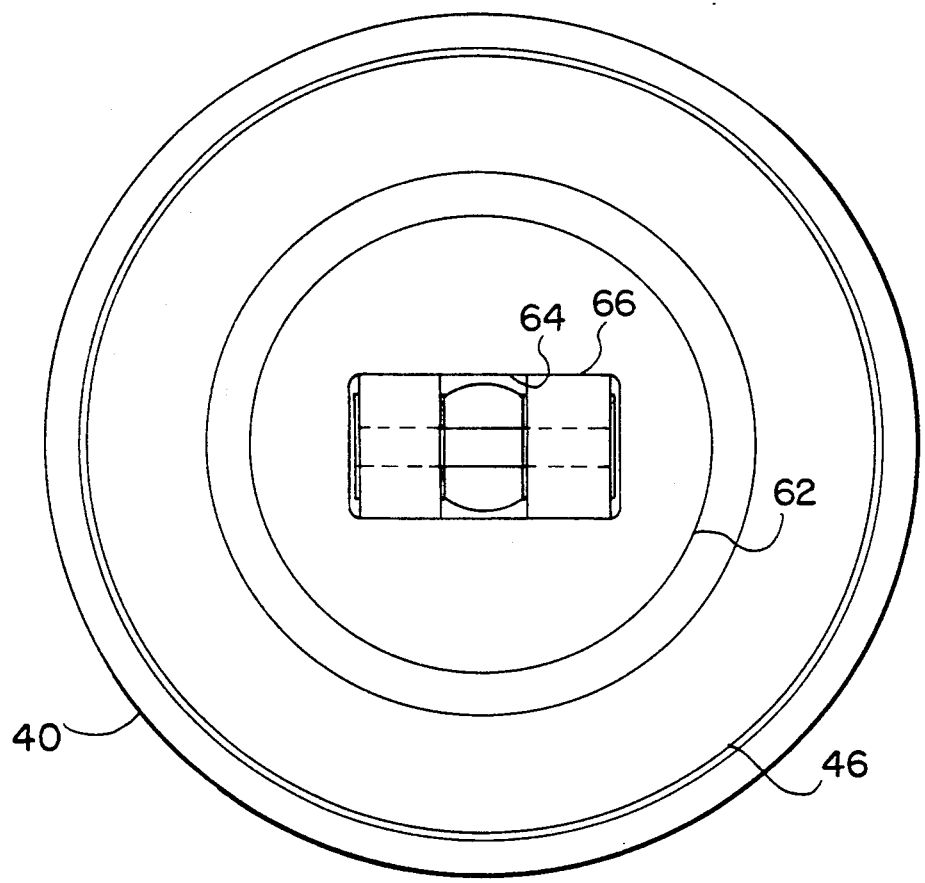
FIG. 3 is a transverse sectional view taken along line 3—3 in FIG. 1A.

Actuator housing 40 is secured around the outer end of bonnet upper bonnet flange 34 and extends in surrounding relation to stem 24 to connect to upper housing ring 42. Stem 24 is reduced in diameter to provide upwardly facing shoulder 44. Cup shaped spring guide 46 is threaded on threaded portion 48 of stem 24 above shoulder 44 and includes upper outer flange 50 against which one end of spring 52 engages. The other end of spring 52 engages upper surface 54 of bonnet flange 34. Thus spring 52 urges spring guide 46 and stem 24 upwardly against ball shaft 56. Ball shaft 56 extends through ball nut 58 with balls 60 positioned within the mating grooves in shaft 56 and nut 58 to provide a low friction means for converting rotation of one into axial movement of shaft 56. Shaft guide 62 is threaded and secured within housing ring 42 and includes axial rectangular shaped opening 64 extending therethrough to receive rollers 66 secured to the sides of the lower end of ball shaft 56 as best seen in FIG. 3. Cap 68 is threaded to the exterior of housing ring 42 and includes central opening 70 through which the outer end of rotary means 72 extends so that it can be manually rotated as hereinafter described. Rotary means 72 is secured to ball nut 58 and both are suitably supported on bearing means for rotation with respect to housing ring 42, shaft guide 62 and ball shaft 56. Sleeve 74 surrounds and is secured to rotary means 72 by suitable lock ring 75 and key 77 to rotate therewith and has outer cylindrical surface 76 which is aligned with outer cylindrical surface 78 on the exterior of upper rim 80 of housing ring 42.

Means 82 (shown in FIGS. 1A and 2A) is provided to retain ball nut 58 and rotary means 72 against rotation with respect to housing ring 42 and ball shaft 56. Such means 82 includes spring 82 which is tightly wrapped around surfaces 76 and 78 and has its tang end 84 secured to rim 80 of housing ring 42 and its other tang end 86 projecting radially outward at a position centrally within the opening 88 in cap 68. When spring 82 is tightly wound it prevents relative rotation between the surfaces 76 and 78 in one direction and such movement is not prevented when its tang end 86 is urged in a direction loosening the tight engagement of spring 82 on surfaces 76 and 78. Rotation of means 72 is provided manually and usually by a handwheel (not shown) connected onto the portion of means 72 extending through opening 70 in cap 68.

Assuming that valve 10 is in the open position as illustrated in FIGS. 1A and 1B, and it becomes desirable to close gate 20 because of a low or high pressure in the downstream line beyond the preset low or high limits, then suitable control means 90 operates disc 92 to move causing tang 86 to be engaged and moved, thereby releasing spring 82 from its engagement with surfaces 76 and 78. This allows spring 52 to force spring guide 46 upwardly. This movement causes stem 24 to move so that gate 20 moves to its closed position as shown in FIGS. 2A and 2B. This movement also moves ball shaft 56 upwardly through nut 58 causing nut 58 to rotate as shaft 56 rises.

Figure 4:
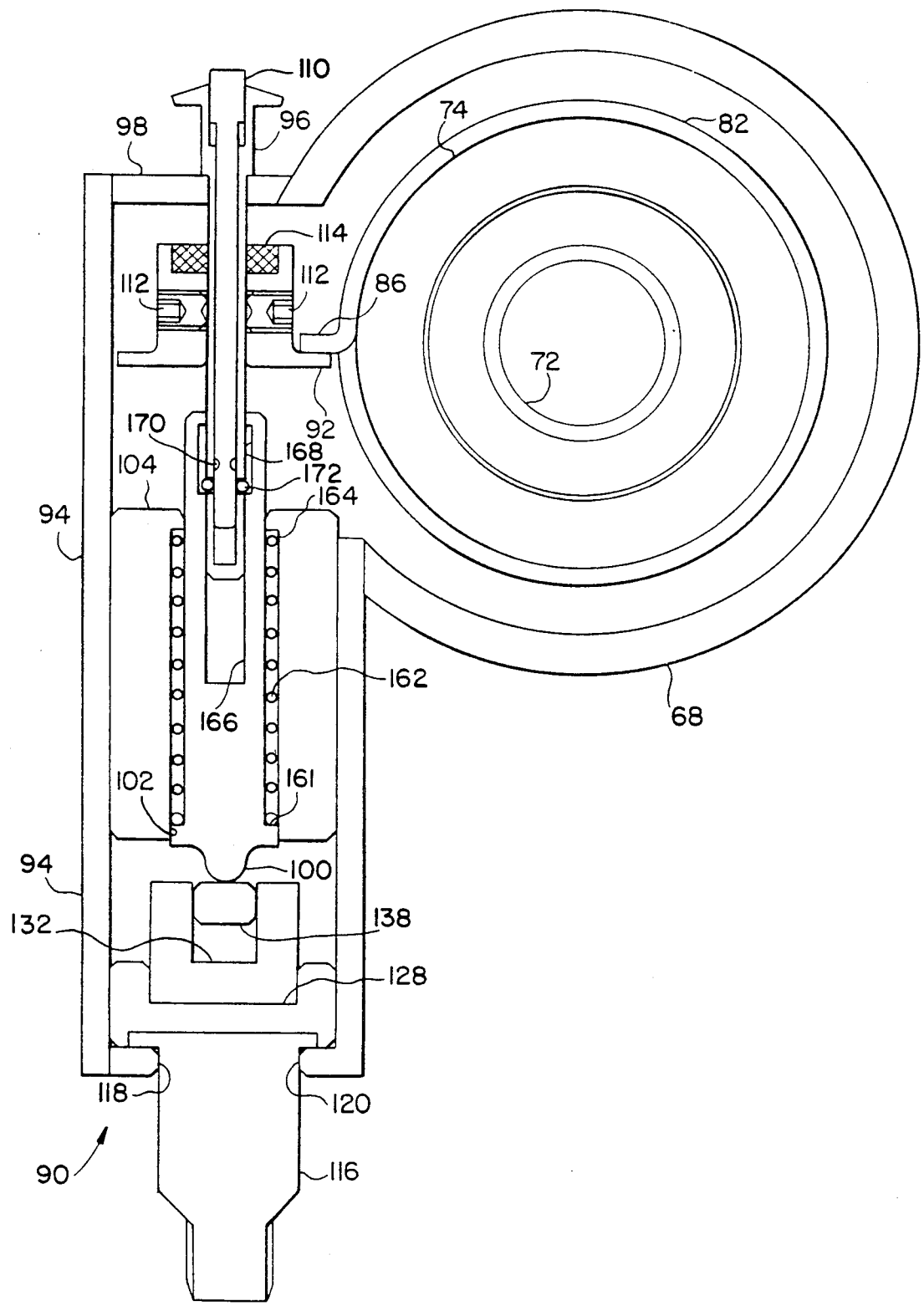
FIG. 4 is a sectional view of the release mechanism illustrating the release collar in its normal position.
Figure 8:
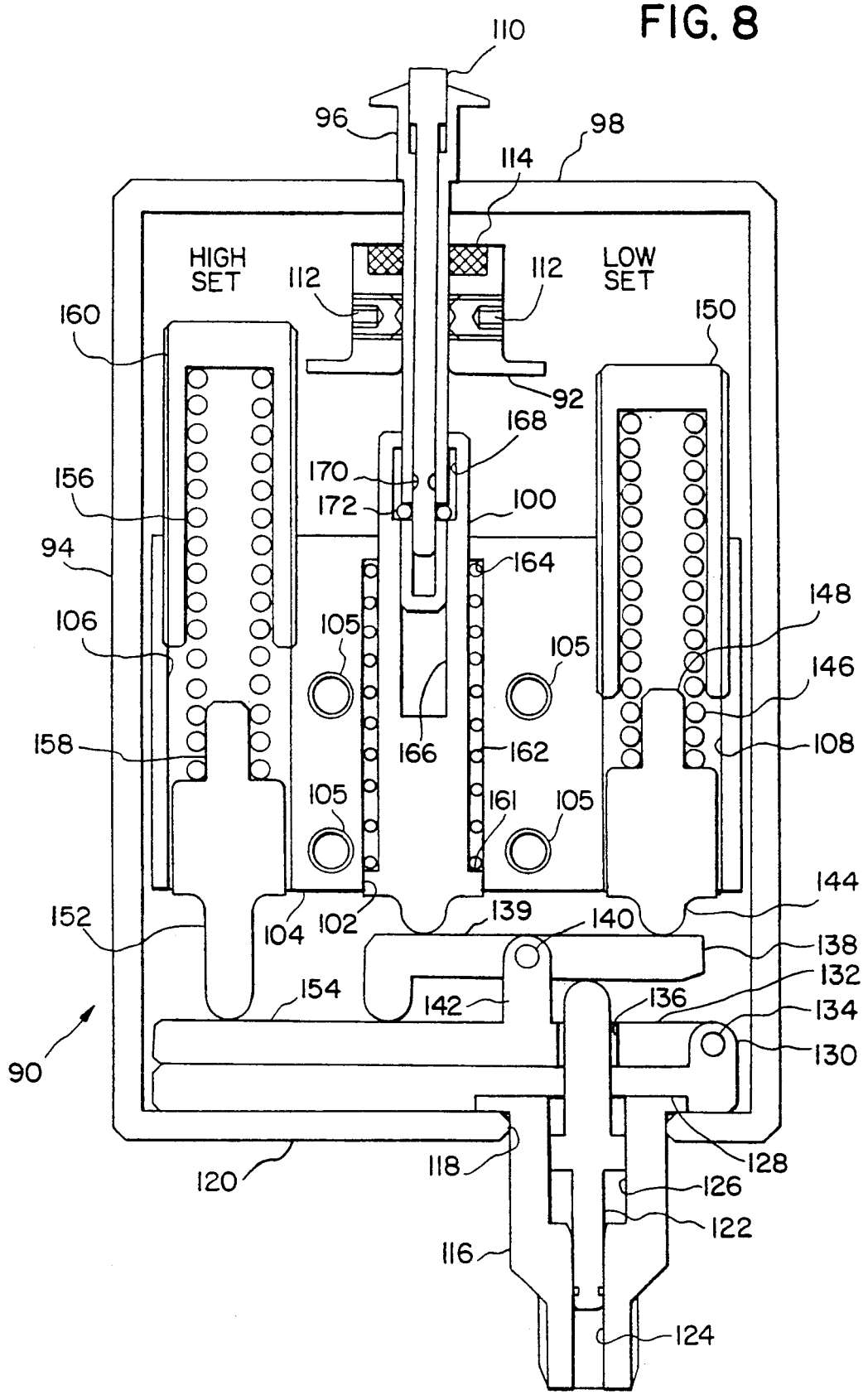
FIG. 8 is a sectional view of the control structure for setting the high and low set points and the release structure in its normal position.

Control means 90 and the engagement between disc 92 and tang 86 are seen in FIG. 4. This view is taken looking down axially on the upper portion of valve 10 at a position slightly above tang 86. Housing 94 is secured to cap 68 as shown and disc 92 is mounted on tubular sleeve 96 which slides through end 98 of housing 94 and is slidable positioned within actuator plunger 100. Plunger 100 is positioned in slot 102 in block 104 which is suitable secured in housing 94 by fastening means 105 and also includes slot 106 and slot 108 on either side of slot 102 as shown in FIG. 8. Control pin 110 is slidably positioned within sleeve 96. Disc 92 is secured to sleeve 96 by set screws 112 so that as sleeve 96 moves axially, disc 92 has the same movement. Magnet 114 is secured in the upper end of disc 92 and is adapted, when disc 92 moves to its extreme position, to come into magnetic engagement with end wall 98 which is made of a suitable magnetic material. When disc 92 moves to such extreme position, magnet 114 retains disc 92 is such position until positively release therefrom as hereinafter described.

As shown in FIG. 8, fitting 116 is secured within opening 118 in end wall 120 of housing 94. Pressure responsive plunger 122 is slidable positioned within passage 124 and bore 126 in fitting 116 and extends through plate 128. Plate 128 is secured to end wall 120 and includes lug 130 through which bar 132 is pivotally mounted by pin 134. Plunger 122 as shown extends through opening 136 in plate 132 and engages plate 138 which is pivotally mounted by pins 140 extending through side posts 142 on plate 132. Plate 138 is engaged on its surface 139 by spring loaded plunger 144 and by plunger 100 which is also spring loaded. Plunger 144 is slidable in slot 108 and is engaged by spring 146 which surrounds upper end 148 of plunger 144 and abuts the interior of cap 150 which is threaded into slot 108. The force exerted by spring 146 on plunger 144 is adjusted by threading cap 150 into and out of slot 108. Plunger 152 is positioned in slot 106 and engages the surface 154 of plate 132 and is urged toward surface 154 by spring 156 which surrounds the inner end 158 of plunger 152 and abuts the interior of cap 160 which is threaded into slot 106. The force exerted by spring 156 on plunger 152 is adjusted by threading cap 160 into and out of slot 106. Spring 162 surrounds plunger 100 and abuts shoulder 161 on plunger 100 and shoulder 164 in block 104. The force on plunger 152 is set to preselect the highest pressure which is acceptable in the outlet 16 of valve 10. The force on plunger 144 is set to preselect the lower pressure which is acceptable in outlet 16 of valve 10. The interior of plunger 100 is bored at 166 and counterbores at 168. Control pin 110 includes annular groove 170 therein and balls 172 are positioned in openings 171 in sleeve 96 and between the exterior of pin 110 and the interior of counterbore 168 as shown in FIGS. 4 and 8. Also, balls 172 are engaged by shoulder 173 between bore 166 and counterbore 168 so that movement of plunger 100 toward wall 98 causes sleeve 96 to move toward wall 98.

Under normal operating conditions, control means 90 is positioned as shown in FIGS. 4 and 8. When control means 90 has been actuated responsive to the sensing of excess high pressure in the downstream side of valve 10 or responsive to pressure less than the preset minimum low pressure, as hereinafter explained, plunger 100 is moved to the position should in FIG. 5 so that disc 92 moves tang 86 as shown. This movement of tang 86 relaxes the engagement of spring 82 allowing relative rotational movement between housing ring 42 and sleeve 74. Under these conditions, the force of spring 52 urges spring guide 46 upward together with gate stem 24 and ball shaft 56. The low friction of the balls 60 allows this upward movement to be translated into a rotation of nut 58, which is no longer restrained by spring 82, and the movement continues until gate 20 is in its closed position as shown in FIG. 2B.

Figure 6:
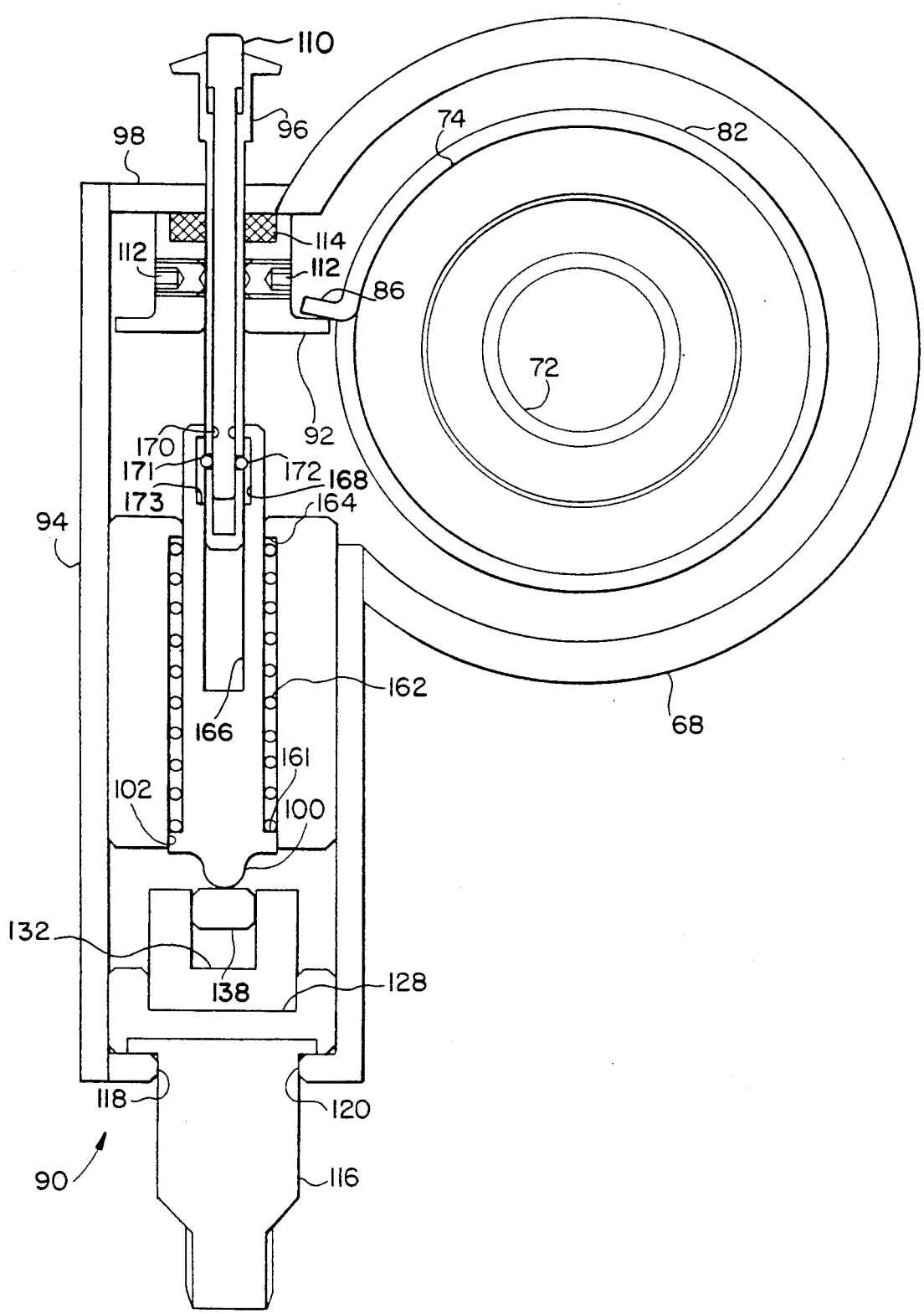
FIG. 6 is another similar sectional view of the release mechanism in its untrip position.

As shown in FIG. 6, control 90 functions to allow movement of plunger away from disc 92 after it is tripped and the downstream pressure returns to acceptable levels. It should be noted that magnet 114 has become attached to end wall 98 and the downward movement of plunger 10 slides downwardly on sleeve 96 without allowing movement of sleeve 96 or control pin 110. Balls 172 remain positioned within openings 173 in sleeve 96. This position causes gate 20 to remain in its closed position until control means 90 is manually reset as hereinafter explained. This is a very real advantage in that it does not allow valve 10 to be opened unless there is someone present to check to be sure that conditions are satisfactory for it to be opened.

Figure 5:
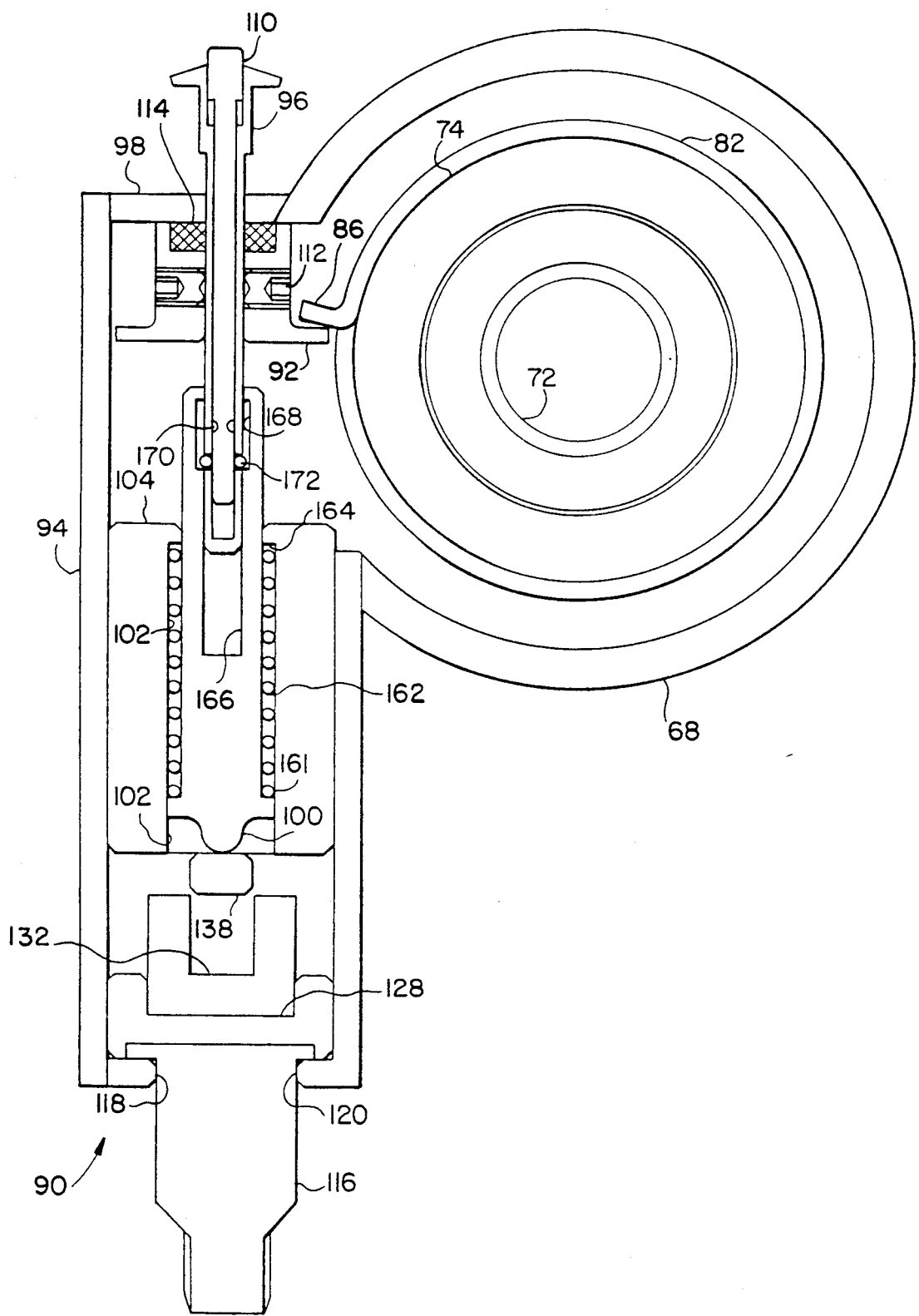
FIG. 5 is a similar sectional view to FIG. 4 showing the release mechanism in its trip position.
Figure 7:
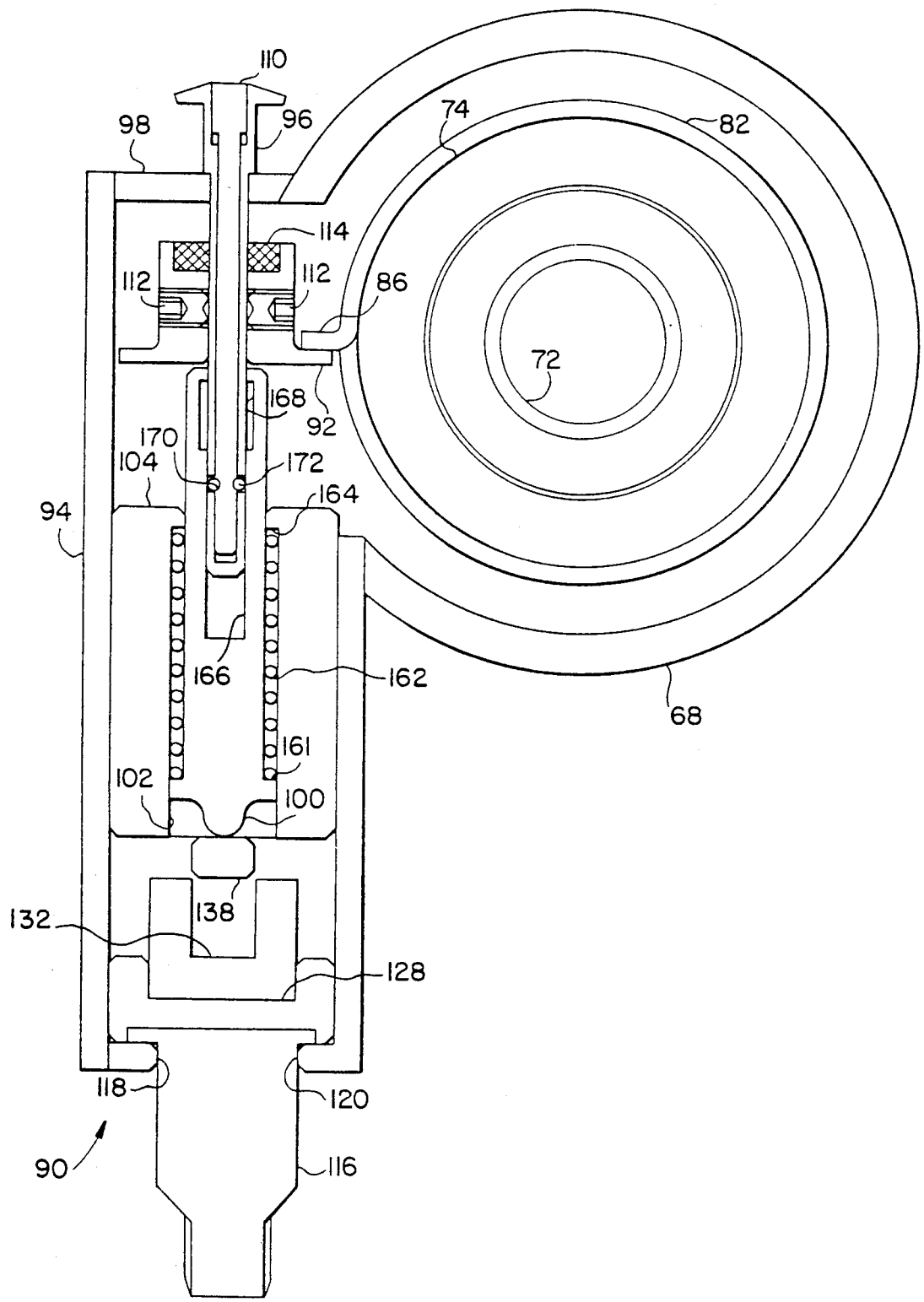
FIG. 7 is another similar sectional view of the release mechanism in its bypass position.

Provision is included in control means 90 to allow the its resetting so that gate 20 can again return to its open position and flow through valve 10 reestablished. This provision is illustrated in FIG. 7. With control means 90 positioned as shown in FIG. 5, control pin 110 is pushed into sleeve 96 to the position shown in FIG. 7. In this position, pin 110 has moved so that its groove 170 is in registry with balls 172 and they allow balls 172 to enter bore 166 of plunger 100. Sleeve 96 is then moved manually to the position shown in FIG. 7 so that disc 92 is moved to the position at which tang 86 has been released and this disables the relative rotation between housing ring 42 and sleeve 74 so that spring 52 cannot return or resist the movement of gate 20. This allows rotary means 72 to be manually rotated to return gate 20 to its open position and establish flow through valve 10 until pressure in the downstream line from valve 10 is allowed to build up to normal levels. This brings plunger 100 to the position shown in FIG. 4 and normal operation of valve 10 can continue.

Figure 9:
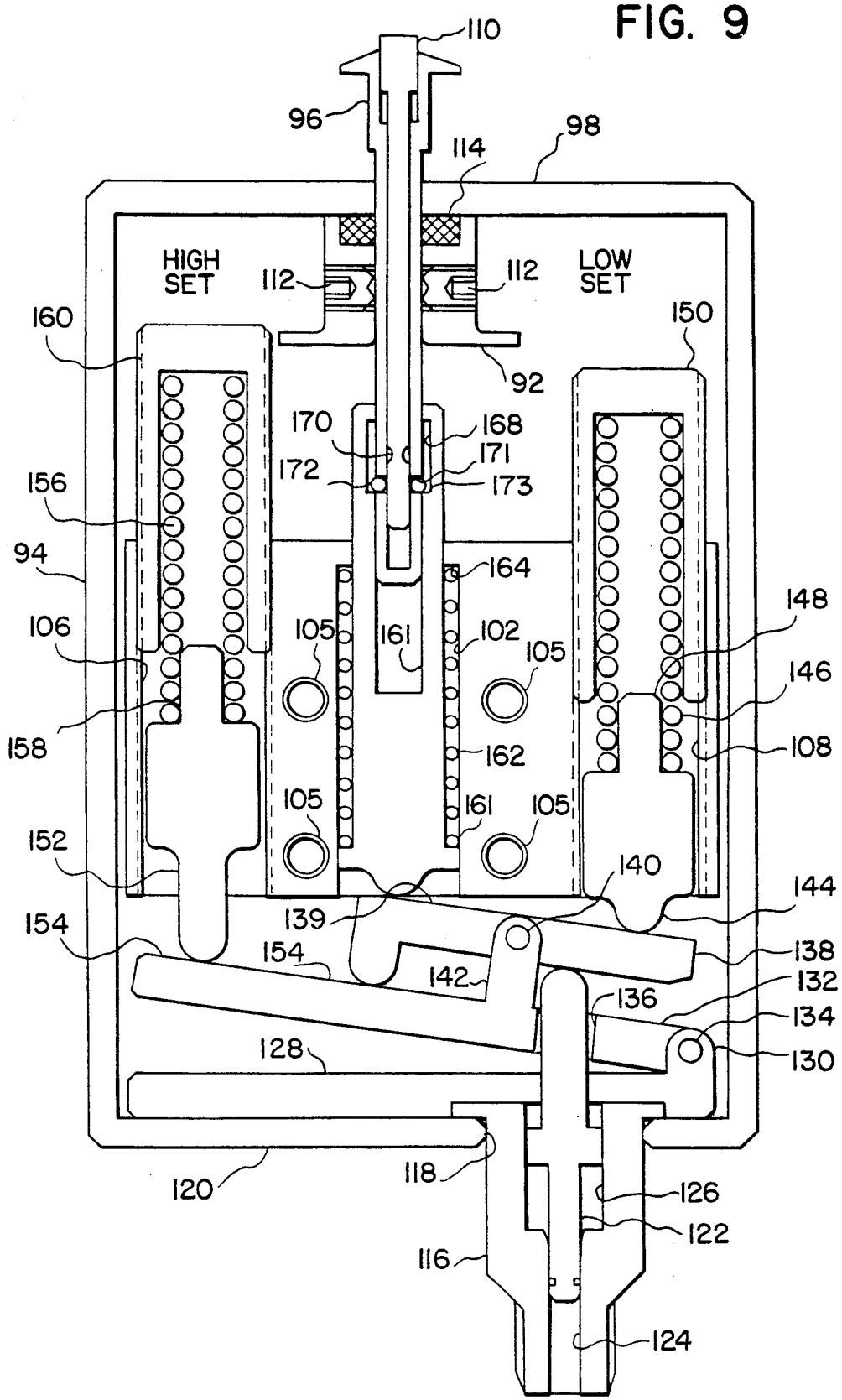
FIG. 9 is a similar sectional view of the control structure and release structure in its high trip mechanism.

As shown in FIG. 8, the positions of the components are shown during normal operation of valve 10 with the downstream pressure staying between the high and low limits set in control means 90. When downstream pressure as delivered to passage 124 of fitting 116 is above the preset high limit it causes plunger 122 to push harder on plate 138. The force balancing of plates 132 and 138 and plungers 100 144 and 152 causes plate 132 to move upward to the position shown in FIG. 9. This moves sleeve 96 upward because of the engagement of balls 172 on the shoulder 171 between bore 166 and counter bore 168 and their engagement within openings 173 to move sleeve upward to the position as shown in FIG. 9. This position is the same as shown in FIG. 5.

Figure 10:
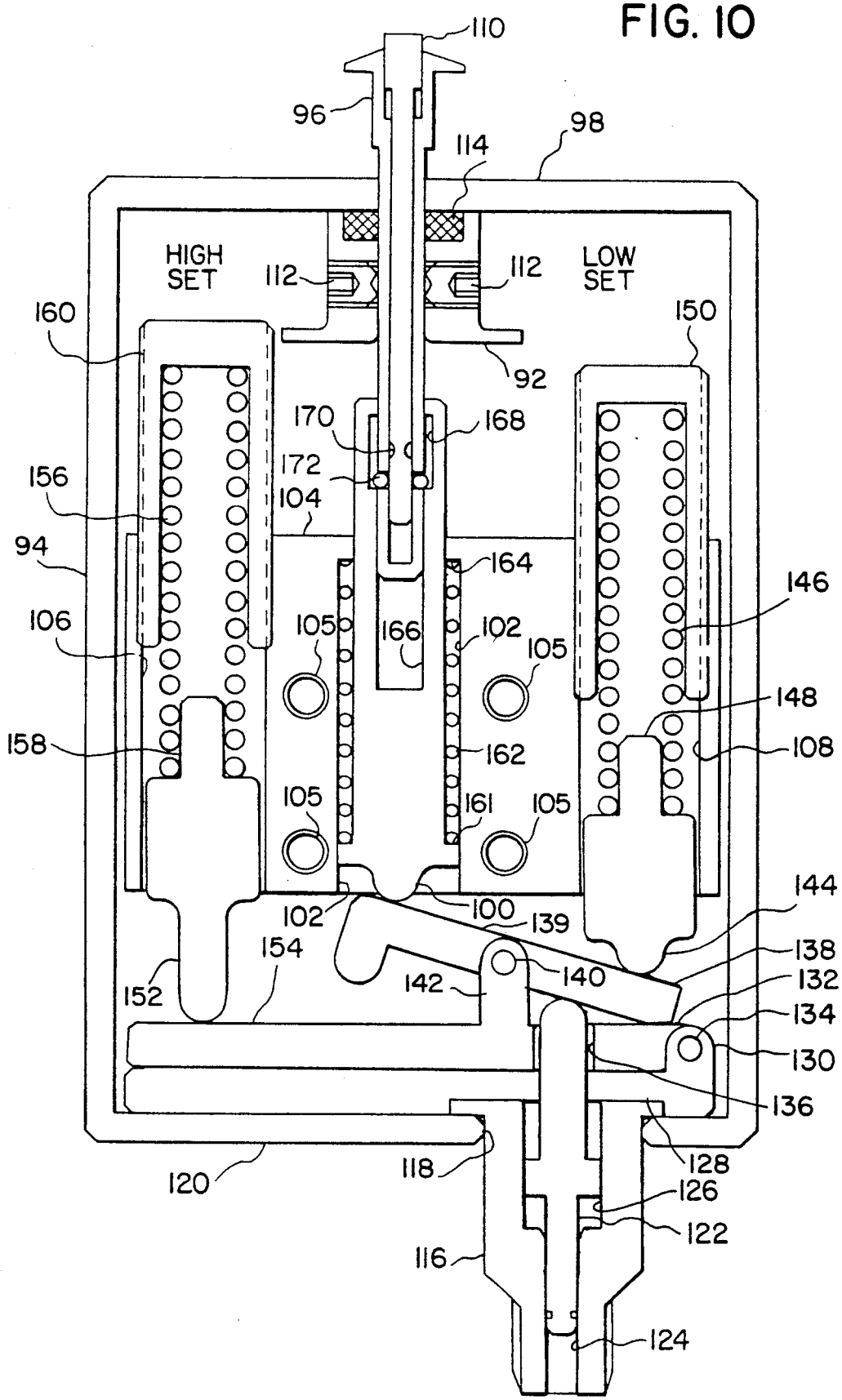
FIG. 10 is another similar sectional view of the control structure in its low trip position.

Similarly, if the pressure in the downstream line sensed in passage 124 is below the low pressure set point, the plunger 122 retracts to the position illustrated in FIG. 10. In this position, plate 132 has returned to its position parallel to wall 120, and plate 138 has pivoted about pin 140 to a position in which plunger 144 is extended and plunger 100 is moved toward end wall 98. In each of the positions shown in FIGS. 9 and 10, control means 90 causes tang 86 of spring 82 to be moved to its release position as shown in FIG. 5, and this allows spring 52 to cause gate 20 to close as previously explained.

From the foregoing it may be seen that the improved valve 10 of the present invention provides to the automatic closing of the valve whenever either of the high and low pressure limits is exceeded. After such closing of valve 10, it cannot open without manual manipulation of control means 90 and rotary means 72. Thus, if there is some continuing reason why valve 10 was closed, it cannot be automatically opened until someone has decided that the closed position is no longer necessary. Additionally, the control means 90 allows the maintaining of automatic shut off in an inactive position until the downstream pressures have been satisfied and control means returns to its normal operating position. This allows opening of the valve 10 after it has been automatically closed even through the pressure sensed is below the minimum set low pressure point.

The improved valve of the present invention is a completely self-contained emergency shutdown valve not requiring any attendance by an individual during or after shutdown. It does not vent any of the fluids flowing through the valve at any time as the stem shoulder 44 engages and provides a metal-to-metal seal with bonnet shoulder 32 whenever gate 20 is in its closed position. This prevents flow around stem 24 in the event that seal 36 has failed. The improved valve does not require any outside power source other than manual resetting for its operation. With the improved valve 10, only a light loading is required to cause a release of the safety shutdown system, and it also includes a means for manually disconnecting the release during manual resetting of the valve.

What is claimed is:
1. A valve comprising
a body having a passage therethrough,
a valve member movably positioned within said body to open and close flow through said passage,
means biasing said valve member toward its closed position,
means for retaining said valve member when it is in its open position,
said retaining means having means for releasing its retention of said valve member in its open position,
a high pressure control means responsive to downstream pressure and having a preset maximum pressure point for actuation,, and
a low pressure control means responsive to downstream pressure and having a preset minimum point for actuation,
said high and low pressure control means when actuated causing release of said releasing means whereby said valve member is moved by said biasing means to its closed position, means retaining said releasing means in its released position until manually released therefrom, low friction manual means for moving said valve member from its closed position to its open position, and a wrapped spring clutch preventing operation of said low friction manual means in one direction until positively released.

2. A valve comprising a body having a passage therethrough, a valve member movably positioned within said body to open and close flow through said passage, means biasing said valve member toward its closed position, means for retaining said valve member when it is in its open position, said retaining means having means for releasing its retention of said valve member in its open position, means responsive to the downstream pressure of said valve for engaging said releasing means to release said retaining means, and low friction manual means for moving said valve member from its closed position to its open position, including a ball shaft, a ball nut, and balls between said shaft and nut to provide the low friction relationship between said shaft and nut.

3. A valve according to claim 2 including a sleeve connected for rotation with said nut and having an external cylindrical surface, a member connected to said shaft to remain stationery therewith and having an external cylindrical surface aligned with said sleeve cylindrical surface, and a spring wound on said two cylindrical surfaces to prevent relative rotation therebetween in one direction and having a tang projecting therefrom forming said releasing means, movement of said tang in a direction unwinding said spring from said surfaces releasing the engagement of said spring on said surfaces which prevents said relative rotation to allow said relative rotation and thus, said closing movement of said valve member.

4. A self-contained emergency shutdown valve comprising a body having an inlet, an outlet and a valve chamber therein with the inlet and the outlet communicating into said chamber, said chamber having an opening through said body other than said inlet and said outlet, a valve member positioned within said valve chamber for movement between a first position closing flow between said inlet and said outlet and a second position opening flow through the valve member through said inlet and said outlet, a low friction manual operator for moving said valve member between said first and said second positions, means for resiliently urging said valve member to said first closed position, a wrapped spring clutch providing a means preventing movement of said valve member and means for positively releasing said movement preventing means, control means having means for sensing the downstream pressure of said valve and means for presetting the maximum and minimum pressure acceptable downstream of the valve, said control means having means connecting said presetting means to said releasing means so that downstream in excess of said maximum pressure setting and downstream pressure below said minimum pressure setting will each cause release of said movement preventing means to allow said resilient urging means to move said valve member to its closed position.

5. A self-contained emergency shutdown valve comprising a body having an inlet, an outlet and a valve chamber therein with the inlet and the outlet communicating into said chamber, said chamber having an opening through said body other than said inlet and said outlet, a valve member positioned within said valve chamber for movement between a first position closing flow between said inlet and said outlet and a second position opening flow through the valve member between said inlet and said outlet, a low friction manual operator for moving said valve member between said first and said second positions, means for resiliently urging said valve member to said first closed position, said manual operator having means preventing movement of said valve member and means for positively releasing said movement preventing means, control means having means for sensing the downstream pressure of said valve and means for presetting the maximum and minimum pressure acceptable downstream of the valve, said control means having means connecting said presetting means to said releasing means so that downstream in excess of said maximum pressure setting and downstream pressure below said minimum pressure setting will each cause release of said movement preventing means to allow said resilient urging means to move said valve member to its closed position, said movement preventing means is a spring wrapped around two aligned, abutting cylindrical surfaces, with one of said surfaces being connected to a non-rotating portion of said low friction manual operator and the other of said surfaces being connected to a rotating portion of said low friction manual operator, said spring having a tang extending to a position for engagement by said releasing means, movement of said tang by said releasing means allowing relative rotation between said cylindrical surfaces so that the urging of said resilient urging means is sufficient to move said valve member to its closed position.

6. A valve according to claim 5 wherein said low friction manual operator includes a ball shaft, a ball nut, and balls positioned between said shaft and nut to allow relative rotation therebetween with low friction.

7. A valve according to claim 6 wherein said shaft is mounted for manual rotation, said nut is mounted to prevent its rotation, whereby rotation of said shaft moves said shaft axially together with movement of said valve member.

8. A valve according to claim 5 wherein said valve is a gate valve, said valve member is a gate.

* * * * *